United States Patent [19]
Einav

[11] Patent Number: 5,294,058
[45] Date of Patent: Mar. 15, 1994

[54] REGULATED DRIP IRRIGATION EMITTER

[75] Inventor: Zvi Einav, Doar Gvat, Israel
[73] Assignee: Plastro-Gvat, Doar Gvat, Israel
[21] Appl. No.: 3,048
[22] Filed: Jan. 11, 1993

[30] Foreign Application Priority Data

Jan. 24, 1992 [IL] Israel .................. 100749

[51] Int. Cl.⁵ .................. B05B 15/00; F15D 1/02
[52] U.S. Cl. .................. 239/533.1; 239/542; 239/570; 138/45
[58] Field of Search .................. 239/542, 533.1, 570; 138/44, 45, 46

[56] References Cited

U.S. PATENT DOCUMENTS

| 2,936,790 | 5/1960 | Dahl et al. | 138/46 |
| 3,474,831 | 10/1969 | Noakes | 137/519.5 X |
| 3,833,019 | 9/1934 | Diggs | 138/45 |
| 3,979,070 | 9/1976 | Lemelshtrich | 239/542 |
| 4,161,291 | 7/1979 | Bentley | 239/570 |
| 4,392,616 | 7/1983 | Olson | 239/542 |
| 4,508,144 | 4/1985 | Bernett | 138/45 |
| 4,533,083 | 8/1985 | Tucker | 239/542 |

FOREIGN PATENT DOCUMENTS

| 467386 | 1/1992 | European Pat. Off. | 239/542 |
| 0935011 | 6/1982 | U.S.S.R. | |
| 8300003 | 1/1983 | World Int. Prop. O. | 239/542 |

*Primary Examiner*—Andres Kashnikow
*Assistant Examiner*—Lesley D. Morris
*Attorney, Agent, or Firm*—Benjamin J. Barish

[57] ABSTRACT

A drip irrigation emitter includes an elastomeric membrane formed on one side with a recess having a flat bottom to define a thin wall section of substantially smaller thickness than the remainder of the elastomeric membrane, and with a flow-restrictor orifice centrally through the thin wall section and of much smaller cross-sectional area than that of the recess to produce a pressure drop in the fluid flowing therethrough to the emitter outlet opening. The membrane is deformable to enlarge or restrict the flow to the outlet opening in response to changes in the inlet pressure to thereby regulate the flow through the outlet opening.

19 Claims, 4 Drawing Sheets

REGULATED DRIP IRRIGATION EMITTER

FIELD AND BACKGROUND OF THE INVENTION

The present invention relates to drip irrigation emitters, and particularly to regulated emitters for supplying irrigation water at a relatively constant rate irrespective of fluctuations in the water supply pressure.

A number of regulated drip irrigation emitters have been described in the patent literature. One type, called an "off-line" emitter, is attachable as an off-line branch to a water supply pipe; examples of such emitters are described in U.S. Pat. Nos. 4,209,133, 4,384,680, 4,718,608, and 4,307,841. Another type, called an "in-line" emitter, is fixed to the inner face of the water supply pipe so as to be connected in-line with respect to the water flowing therethrough; an example of such a regulated emitter is described in U.S. Pat. No. 4,687,143).

OBJECTS AND BRIEF SUMMARY OF THE INVENTION

An object of the present invention is to provide another regulated drip irrigation emitter construction which is suitable for both the off-line and the in-line types, and which can be produced in volume and at low cost.

According to the present invention, there is provided a drip irrigation emitter comprising a housing formed with an inlet opening and an outlet opening; and an elastomeric membrane located in the housing and defining an inlet chamber communicating with the inlet opening, and an outlet chamber communicating with the outlet opening. The elastomeric membrane is formed on one side with a recess partially through the membrane to define a thin wall section of substantially smaller thickness than the remainder of the elastomeric membrane. The elastomeric membrane is further formed with a flow-restrictor orifice centrally through the thin wall section and of much smaller cross-sectional area than that of the recess to produce a pressure drop in the fluid flowing therethrough and through the outlet chamber to the outlet opening. The membrane is deformable such that a portion thereof, laterally of the recess and orifice and aligned with the outlet opening, is displaceable towards and away from the outlet opening to restrict or enlarge the flow thereto in response to changes in the inlet pressure and thereby to regulate the flow through the outlet opening.

It will be seen from the description below that drip irrigation emitters may be constructed in accordance with the foregoing features either as off-line emitters or as in-line emitters, and also that such emitters can be produced in volume and at low cost.

DESCRIPTION OF PREFERRED EMBODIMENTS

Figure 1:
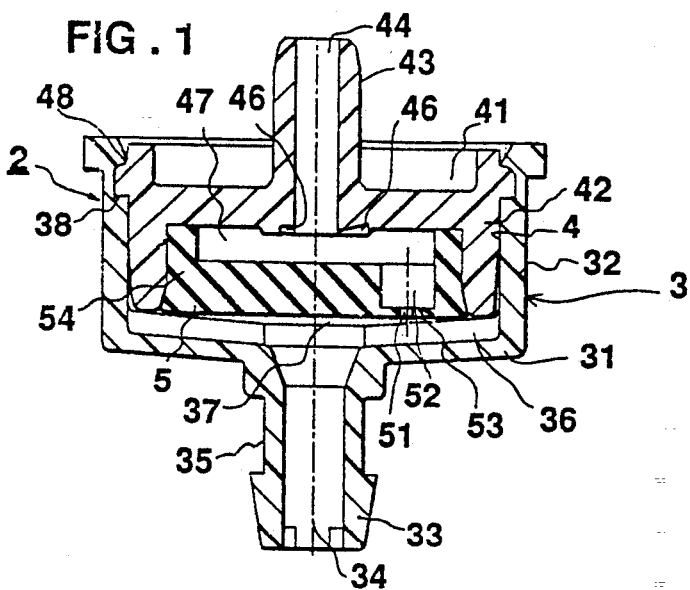
FIG. 1 is a longitudinal sectional view illustrating one form of off-line drip irrigation emitter constructed in accordance with the present invention.
Figure 2:
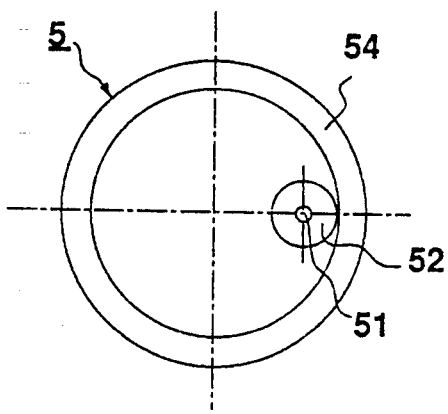
FIG. 2 is a top plan view illustrating the elastomeric membrane in the emitter of FIG. 1.

The device illustrated in FIGS. 1 and 2 is an off-line emitter. It includes a housing 2 made of two sections 3, 4 fixed together with an elastomeric membrane 5 interposed between the two housing sections.

Housing section 3 includes a circular end wall 31 and a generally cylindrical side wall 32. End wall 31 is integrally formed with a nipple 33 extending axially of the housing and having an inlet opening 34. Nipple 33 is further formed with an annular recess 35 to enable the emitter to be inserted into a water-discharge opening in a water supply pipe (not shown). The inner surface of the circular end wall 31 is formed with a plurality of radially-extending ribs 36 to space the respective face of the elastomeric membrane 5 from the inner surface of wall 31, and thereby to define an inlet chamber 37 between wall 31 and the membrane 5.

The inner face of the cylindrical side wall 32 of housing section 3 is formed at its upper end with another annular groove 38 for attaching thereto housing section 4.

Housing section 4 is also formed with a circular end wall 41, a cylindrical side wall 42, an axially-extending nipple 43 integral with its end wall 41, and an opening 44 through the nipple 43. In this case, opening 44 serves as the outlet opening from the emitter. The inner face of the circular end wall 41 is further formed with a notch 46 communicating with outlet opening 44, for a purpose to be described more particularly below.

The inner face of wall 41 is sealingly engaged by the periphery of the elastomeric membrane 5 to define an outlet chamber 47 communicating with the outlet opening 44 on one side of the membrane, and the inlet chamber 37 communicating with the inlet opening 34 on the other side of the membrane. Housing section 4 is fixed to housing section 3 by means of an annular rib 48 formed on the outer surface of section 4 adapted to be received, with a snap fit, onto the annular groove 38 of housing section 3.

Membrane 5 is made of an elastomeric material, such as natural or synthetic rubber. Its side facing the outlet opening 44 is formed with a recess 52 passing partially through the membrane eccentrically thereof and having a flat bottom to define a thin wall section 53 of substantially smaller thickness than the remainder of the elastomeric membrane. The elastomeric membrane is further formed with a flow-restrictor orifice 51 centrally through the thin wall section 53 and of a very small diameter to have a much smaller cross-sectional area than that of the recess 52. As will be described more particularly below, orifice 51 produces a pressure drop in the fluid flowing therethrough, and through the outlet control chamber 47 to the outlet opening 44. The membrane is deformable such that the portion thereof, laterally of the recess 52 and orifice 51, aligned with outlet opening 44 is displaceable towards or away from the outlet opening to restrict or enlarge the flow thereto in response to the changes in the inlet pressure to thereby regulate the flow through the outlet opening in accordance with changes in the inlet pressure.

In the construction illustrated in FIGS. 1 and 2, the side of elastomeric membrane 5 facing the outlet opening 44 is formed with an annular wall 54 extending axially of the emitter and engageable with the inner surface of housing section 4 to create a cavity defining the outlet chamber 47. The other side of elastomeric membrane 5 facing the inlet opening 34 is planar.

The emitter illustrated in FIGS. 1 and 2 operates as follows: Pressurized water from the water supply pipe (not shown) to which nipple 33 of the emitter is attached, is inletted into the interior of the emitter housing 2 via inlet opening 34 and flows via the flow-restrictor orifice 51 from the inlet chamber 37 to the outlet chamber 47, and through the outlet opening 44. Orifice 51 thus restricts the flow of the water to a low rate. If this orifice should become clogged, the pressure in the chamber will tend to build up. Because of the elastomeric nature of membrane 5, and particularly because of the thinness of wall section 53 of the membrane through which orifice 51 is formed, a build up of pressure in the inlet chamber 37 will cause wall section 53 of the membrane to deform and to expel the clogging particle out of orifice 51 and into the outlet chamber 47.

The elastomeric membrane 5 is deformable to displace the central portion thereof towards the mouth of the outlet opening 44 with an increase in the inlet pressure, thereby restricting the flow of the water from the outlet chamber 47 into the outlet opening 44. Accordingly, the illustrated emitter will also regulate the flow through the outlet opening 44 despite variations in the inlet pressure.

Notch 46 formed in the inner face of the housing end wall 41 communicates with the outlet opening 44 and prevents complete blockage of flow through the outlet opening 44 even under high inlet pressures.

Figure 3:
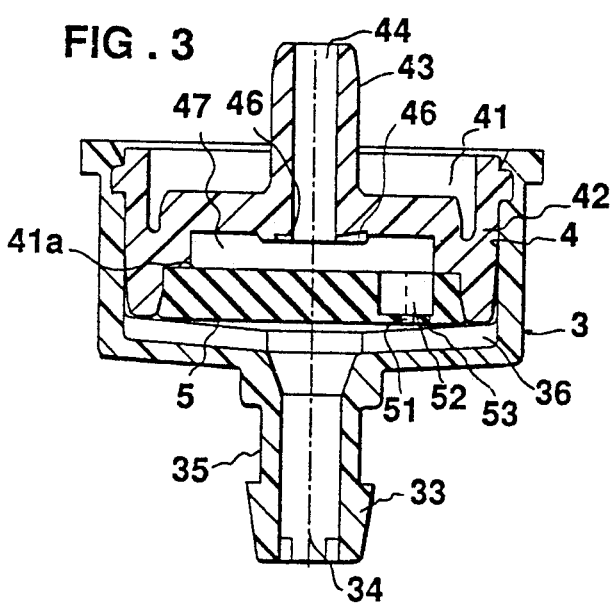
FIG. 3 is a view similar to that of FIG. 1 but illustrating another off-line emitter construction in accordance with the present invention.
Figure 4:
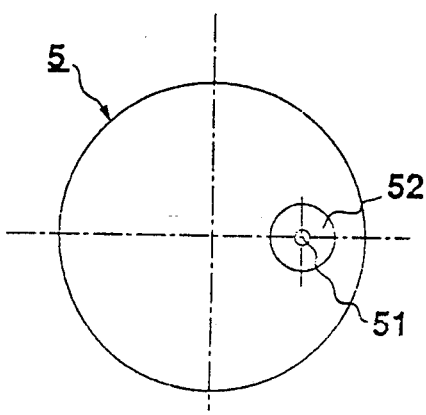
FIG. 4 is a top plan view of the elastomeric membrane in the emitter of FIG. 3.
Figure 5:
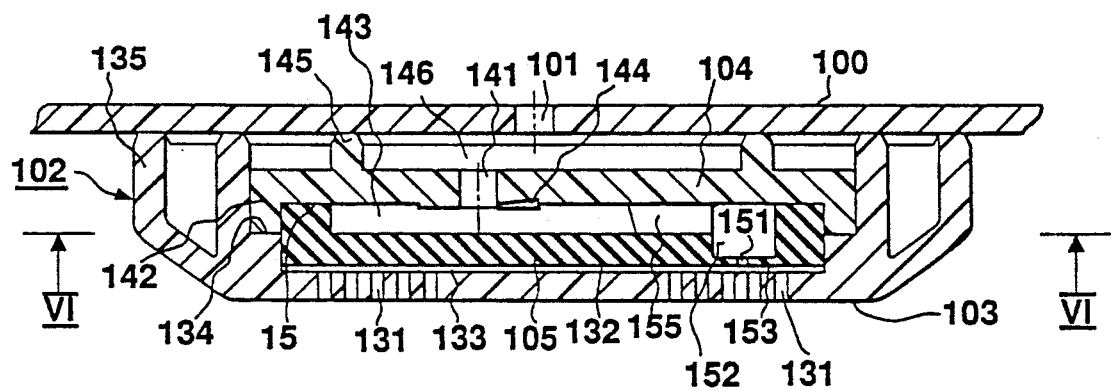
FIG. 5 is a longitudinal sectional view illustrating one form of in-line emitter construction in accordance with the present invention.
Figure 6:
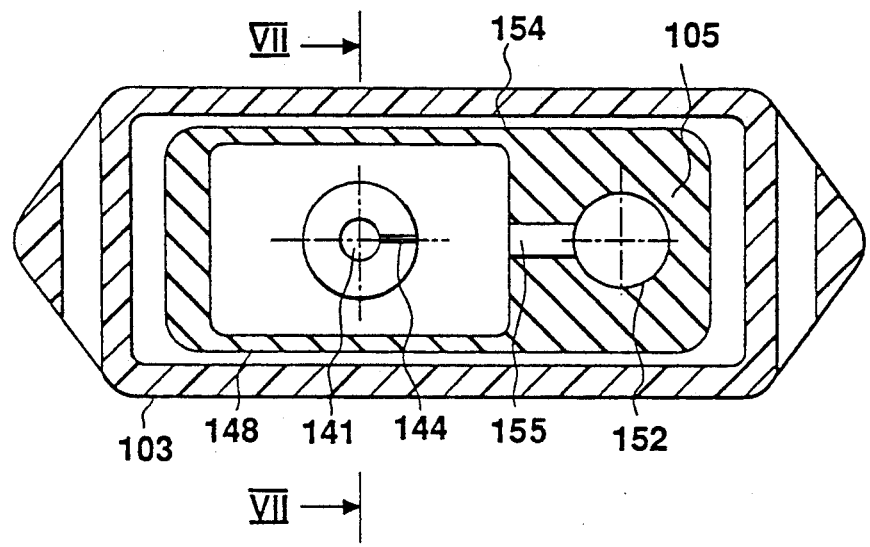
FIG. 6 is a sectional view along line VI—VI of FIG. 5.
Figure 7:
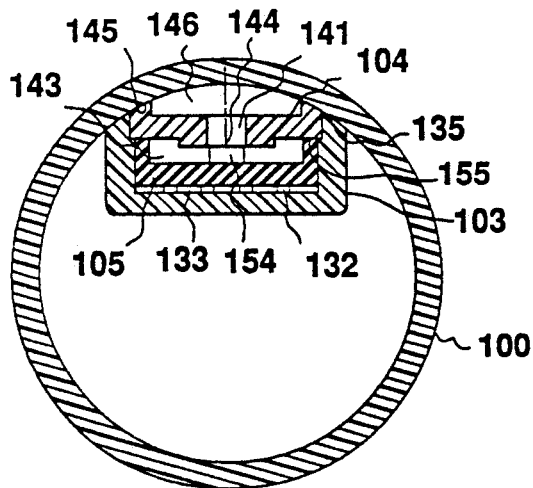
FIG. 7 is a sectional view along line VII—VII of FIG. 6.
Figure 8:
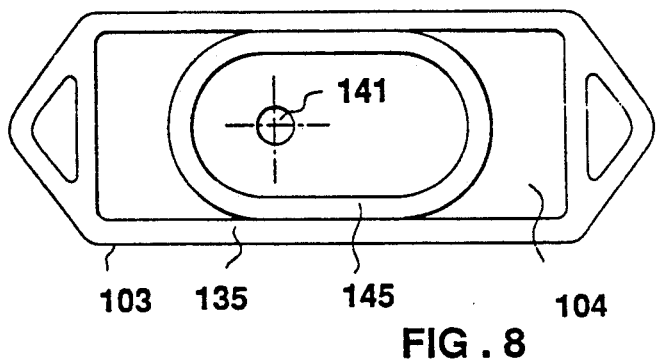
FIG. 8 is a top plan view of the emitter of FIGS. 5-7.
Figure 11:
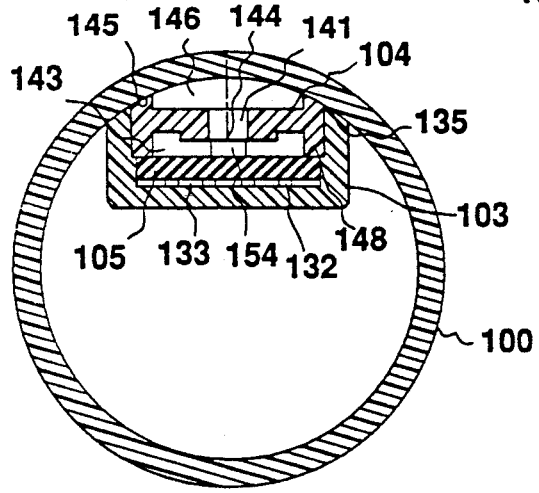
FIGS. 9-12 are views corresponding to those of FIGS. 5-8 illustrating another in-line emitter construction in accordance with the present invention.
Figure 12:
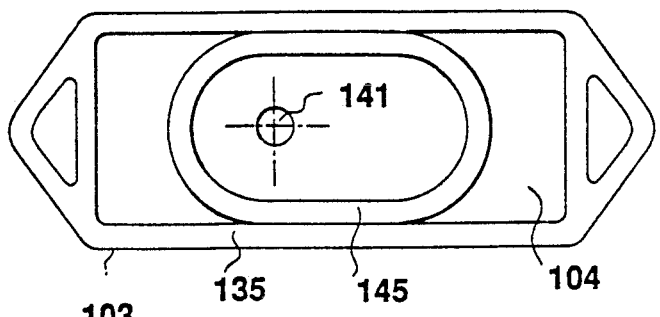
Figure 9:
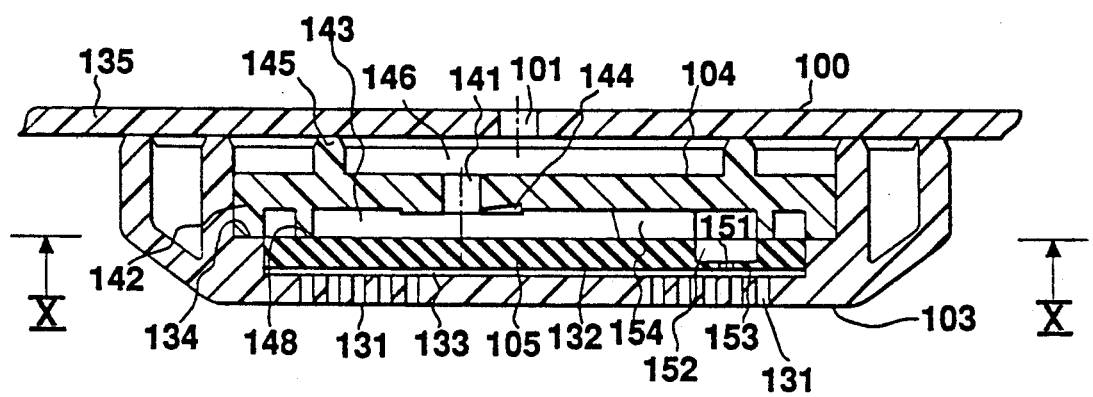
Figure 10:
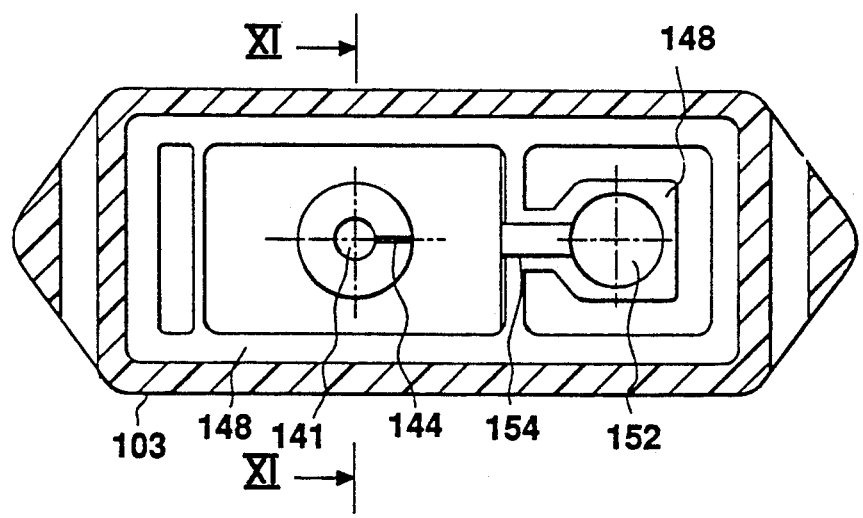

FIGS. 3 and 4 illustrate an off-line emitter of substantially the same construction as in FIGS. 1 and 2. In order to facilitate understanding, the same parts are correspondingly numbered.

In the construction of FIGS. 3 and 4, the outlet chamber 47 is not defined by a cavity formed in the elastomeric membrane 5, but rather is defined by a cavity formed in the end wall 41 of housing section 4. Thus, end wall 41 includes an annular shoulder 41a engaging the outer periphery of the elastomeric membrane 5 and spacing the membrane from the inner face of wall 41 to define the outlet chamber 47. In the construction of FIGS. 3 and 4, therefore, both sides of the elastomeric membrane 5 are planar.

In all other respects, the emitter illustrated in FIGS. 3 and 4 is constructed and operates in the same manner as described above with respect to the emitter of FIGS. 1 and 2.

FIGS. 5-8 illustrate an in-line emitter adapted to be attached, as by plastic-welding, to the inner surface of a water supply pipe 100 having a water discharge opening 101. The emitter illustrated in FIGS. 5-8 also includes a housing 102 formed of two housing sections 103, 104, with an elastomeric membrane 105 interposed between the two housing sections. In this construction, the two housing sections 103, 104 are of generally rectangular configuration.

Housing section 103 is formed with a plurality of openings 131 serving as inlet openings to the emitter. In addition, the inner surface of housing section 103 is formed with one or more ribs 132 engageable with the respective side of the elastomeric membrane 105 and thereby spacing it from the inner face of housing section 131 to define an inlet chamber 133.

The inner face of housing section 103 is further formed with a peripherally-extending ledge 134 engageable with housing section 104 when the two housing sections are attached together and to the inner face of the water supply pipe 100 with the elastomeric membrane 105 in between the two housing sections The outer periphery of housing section 103 is extended, as shown at 135, so as to be engageable with the inner surface of the water supply pipe 100 when the emitter is attached thereto.

Housing section 104 is formed with an outlet opening 141 communicating with the water discharge opening 101 in the water supply pipe 100. Housing section 104 is further formed with a peripheral rib 142 engageable with ledge 134 in housing section 103 when the two housing sections are assembled together with the elastomeric membrane 105 in between. The inner side of housing section 104 is similarly formed with a notch 144 communicating with outlet opening 141 and serving the same purpose as notch 46 in FIG. 1.

The opposite side of housing section 104 is formed with an annular rib 145 which engages the inner surface of the water supply pipe 100 in order to define a discharge chamber 146 between the emitter outlet opening 141 and the water discharge opening 101 in the water supply pipe 100.

As in the construction of FIGS. 1 and 2, elastomeric membrane 105 sealingly engages, around its outer periphery, the inner face of housing section 104 to define the previously-mentioned inlet chamber 133 on one side of the membrane communicating with the inlet openings 131, and an outlet control chamber 143 on the opposite side of the membrane and communicating with the outlet opening 141. The side of the elastomeric membrane 105 facing the outlet opening 141 is formed with a recess 152 having a flat bottom to define a thin wall section 153 of substantially smaller thickness than the remainder of the membrane. A flow-restrictor orifice 151 is formed centrally through the thin wall section 153 and is of much smaller cross-sectional area than that of the recess 152, as in the construction of FIGS. 1 and 2.

Also as in the construction of FIGS. 1 and 2, the outlet chamber 143 communicating with the outlet opening 146 is defined by the elastomeric membrane 105. Thus, membrane 105 includes an annular rib 154 engageable with the inner surface of housing section 104 to define the cavity in the membrane serving as the outlet chamber 143. A passageway 155 through rib 154 connects recess 152 to the outlet control chamber 143.

It will be seen that the emitter illustrated in FIGS. 5-8 operates substantially in the same manner as described above with respect to FIGS. 1 and 2. Thus, the water inletted via the inlet openings 131 into the inlet chamber 133 will pass through the flow restrictor orifice 151 into the outlet chamber 143, and from there via the outlet opening 141 into the water discharge chamber 146 and water discharge opening 141 formed in the water supply pipe 100. Should orifice 152 become clogged, the thin wall section 153 in which the orifice 151 is formed will deform to expel the clogging particle into the outlet chamber 143. In addition, should the inlet pressure increase, membrane 105 will be deformed to displace a portion thereof towards the outlet opening 141 to thereby regulate the flow through that opening.

The on-line emitter illustrated in FIGS. 9-12 is constructed, and operates, substantially in the same manner as described above with respect to FIGS. 5-8, and therefore the same parts have been correspondingly numbered. In the construction illustrated in FIGS. 9-12, however, housing section 104 having the outlet opening 141 is formed with an annular rib 148 engageable with the respective side of the elastomeric membrane 105, to thereby define the cavity serving as the outlet chamber in communication with the outlet opening 141. The elastomeric membrane 105 is thus planar on both its sides.

What is claimed is:

1. A drip irrigation emitter, comprising: a housing formed with an inlet opening and an outlet opening; and an elastomeric membrane located in said housing and defining an inlet chamber communicating with said inlet opening, and an outlet chamber communicating with said outlet opening; said elastomeric membrane being formed on one side with a recess partially through the membrane to define a thin wall section of substantially smaller thickness than the remainder of the elastomeric membrane; said elastomeric membrane being further formed with a flow-restrictor orifice through said thin wall section and of much smaller cross-sectional area than that of said recess to produce a pressure drop in the fluid flowing therethrough and through the outlet chamber to said outlet opening, said membrane being deformable such that a portion thereof, laterally of said recess and orifice and aligned with said outlet opening, is displaceable towards and away from said outlet opening to restrict or enlarge the flow thereto in response to changes in the inlet pressure and thereby to regulate the flow through said outlet opening.

2. The emitter according to claim 1, wherein said recess having said flow-restrictor orifice is formed in the side of said elastomeric membrane facing said outlet opening.

3. The emitter according to claim 1, wherein said orifice is formed centrally through said recess and said recess is formed eccentrically in said elastomeric membrane.

4. The emitter according to claim 1, wherein said outlet opening is formed through a face of a wall of the housing, and wherein said face of the housing wall formed with said outlet opening is further formed with a notch communicating with said outlet opening to prevent complete blockage of flow therethrough by said elastomeric membrane.

5. The emitter according to claim 1, wherein said outlet chamber is defined by a cavity formed in said elastomeric membrane on the side thereof facing said outlet opening.

6. The emitter according to claim 1, wherein said outlet chamber is defined by a cavity formed in a wall of the housing having said outlet opening.

7. The emitter according to claim 1, wherein said housing is made of two sections fixed to each other with said elastomeric membrane in between.

8. The emitter according to claim 7, wherein one of said housing sections includes an inlet nipple through which the inlet opening is formed, and the other of said housing sections includes an outlet nipple through which the outlet opening is formed.

9. The emitter according to claim 1, wherein said housing is made of two sections adapted to be fixed to the inner surface of a water supply pipe with the elastomeric membrane in between the two sections, and with the outlet opening communicating with a water discharge opening in the water supply pipe; one of said housing sections including said inlet opening; the other of said housing sections including said outlet opening.

10. The emitter according to claim 9, wherein said outlet opening is formed through a face of a wall of the housing, and wherein said housing wall formed with said outlet opening is further formed with a rib circumscribing said outlet opening and adapted to space said housing wall from the inner surface of the water supply pipe when fixed thereto.

11. A drip irrigation emitter, comprising: a housing formed with an inlet opening and an outlet opening; and an elastomeric membrane located in said housing and defining an inlet chamber communicating with said inlet opening, and an outlet chamber communicating with said outlet opening; said elastomeric membrane being formed on one side with a recess partially through the membrane eccentrically thereof to define a thin wall section of substantially smaller thickness than the remainder of the elastomeric membrane; said elastomeric membrane being further formed with a flow-restrictor orifice through said thin wall section centrally of said recess and of much smaller cross-sectional area than that of said recess to produce a pressure drop in the fluid flowing therethrough and through the outlet chamber to said outlet opening, said membrane being deformable such that a portion thereof, laterally of said recess and orifice and aligned with said outlet opening, is displaceable towards and away from said outlet opening to restrict or enlarge the flow thereto in response to changes in the inlet pressure and thereby to regulate the flow through said outlet opening.

12. The emitter according to claim 11, wherein said recess having said flow-restrictor orifice is formed in the side of said elastomeric membrane facing said outlet opening.

13. The emitter according to claim 11, wherein said outlet opening is formed through a face of a wall of the housing and wherein aid face of the housing wall formed with said outlet opening is further formed with a notch communicating with said outlet opening to prevent complete blockage of flow therethrough by said elastomeric membrane.

14. The emitter according to claim 11, wherein said outlet chamber is defined by a cavity formed in said elastomeric membrane on the side thereof facing said outlet opening.

15. A drip irrigation emitter, comprising: a housing formed with an inlet opening and an outlet opening; and an elastomeric membrane located in said housing and defining an inlet chamber communicating with said inlet opening, and an outlet chamber communicating with said outlet opening; said elastomeric membrane being formed on one side with a recess partially through the membrane to define a thin wall section of substantially smaller thickness than the remainder of the elastomeric membrane; said elastomeric membrane being further formed with a flow-restrictor orifice through said thin wall section, in the side of said elastomeric membrane facing said outlet opening, and of much smaller cross-sectional area than that of said recess to produce a pressure drop in the fluid flowing therethrough and through the outlet chamber to said outlet opening, said membrane being deformable such that a portion thereof, laterally of said recess and orifice and aligned with said outlet opening, is displaceable towards and away from said outlet opening to restrict or enlarge the flow thereto in response to changes in the inlet pressure and thereby to regulate the flow through said outlet opening.

16. The emitter according to claim 15, wherein said orifice is formed centrally through said recess and said recess is formed eccentrically in said elastomeric membrane.

17. The emitter according to claim 15, wherein said housing is made of two sections fixed to each other with said elastomeric membrane in between, one of said housing sections including an inlet nipple through which the inlet opening is formed, and the other of said housing sections including an outlet nipple through which the outlet opening is formed.

18. The emitter according to claim 15, wherein said housing is made of two sections adapted to be fixed to the inner surface of a water supply pipe with the elastomeric membrane in between the two sections, and with the outlet opening communicating with a water discharge opening in the water supply pipe; one of said housing sections including said inlet opening; the other of said housing sections including said outlet opening.

19. The emitter according to claim 18, wherein said outlet opening is formed through a face of the housing, and wherein said housing wall formed with said outlet opening is further formed with a rib circumscribing said outlet opening and adapted to space said housing wall from the inner surface of the water supply pipe when fixed thereto.

* * * * *